(12) United States Patent
Burns et al.

(10) Patent No.: US 11,135,754 B2
(45) Date of Patent: *Oct. 5, 2021

(54) REMOTE CONTROLLER FOR CONTROLLING APPARATUS BY DIVERTING FEEDBACK SIGNAL FROM NATIVE CONTROLLER TO THE REMOTE CONTROLLER AND METHODS FOR SAME

(71) Applicant: IMFLUX INC., Hamilton, OH (US)

(72) Inventors: Brian Matthew Burns, Mason, OH (US); Gene Michael Altonen, West Chester, OH (US)

(73) Assignee: IMFLUX INC., Hamilton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,242

(22) Filed: Jan. 14, 2020

(65) Prior Publication Data

US 2020/0189163 A1 Jun. 18, 2020

Related U.S. Application Data

(62) Division of application No. 15/378,874, filed on Dec. 14, 2016, now Pat. No. 10,583,600.

(Continued)

(51) Int. Cl.
  *B29C 45/77* (2006.01)
  *B29C 45/76* (2006.01)
  (Continued)

(52) U.S. Cl.
  CPC .............. *B29C 45/77* (2013.01); *B29C 31/04* (2013.01); *B29C 45/18* (2013.01); *B29C 45/64* (2013.01);
  (Continued)

(58) Field of Classification Search
  CPC ......... B29C 45/77; B29C 31/04; B29C 45/18; B29C 45/64; B29C 45/76; B29C 45/82;
  (Continued)

(56) References Cited

U.S. PATENT DOCUMENTS

| 4,311,446 A | 1/1982 | Hold et al. |
| 4,988,273 A | 1/1991 | Faig et al. |

(Continued)

FOREIGN PATENT DOCUMENTS

| CN | 102893515 A | 1/2013 |
| EP | 2919023 A1 | 9/2015 |

(Continued)

OTHER PUBLICATIONS

International Search Report and Written Opinion, International Application No. PCT/US2016/065497, dated Mar. 29, 2017.

(Continued)

*Primary Examiner* — Rocio Del Mar Perez-Velez
*Assistant Examiner* — Alicia M. Choi
(74) *Attorney, Agent, or Firm* — Marshall, Gerstein & Borun LLP

(57) ABSTRACT

A remote controller can be provided on any apparatus that employs feedback control from a native controller to add functionality to the apparatus where the native controller is not capable of providing such functionality independently.

5 Claims, 2 Drawing Sheets

Related U.S. Application Data

(60) Provisional application No. 62/267,003, filed on Dec. 14, 2015.

(51) Int. Cl.
*B29C 31/04* (2006.01)
*B29C 45/18* (2006.01)
*B29C 45/64* (2006.01)
*B29C 45/82* (2006.01)
*B29K 101/12* (2006.01)

(52) U.S. Cl.
CPC .............. *B29C 45/76* (2013.01); *B29C 45/82* (2013.01); *B29C 2945/7604* (2013.01); *B29C 2945/76006* (2013.01); *B29C 2945/76626* (2013.01); *B29C 2945/76193* (2013.01); *B29C 2945/76214* (2013.01); *B29C 2945/76367* (2013.01); *B29C 2945/76381* (2013.01); *B29C 2945/76568* (2013.01); *B29C 2945/76665* (2013.01); *B29C 2945/76859* (2013.01); *B29C 2945/76936* (2013.01); *B29C 2945/76969* (2013.01); *B29C 2945/76993* (2013.01); *B29K 2101/12* (2013.01); *G05B 2219/2624* (2013.01)

(58) Field of Classification Search
CPC .. B29C 2945/76006; B29C 2945/7604; B29C 2945/76193; B29C 2945/76214; B29C 2945/76626; B29C 2945/76367; B29C 2945/76381; B29C 2945/76568; B29C 2945/76665; B29C 2945/76859; B29C 2945/76936; B29C 2945/76969; B29C 2945/76993; G05B 2219/2624; B29K 2101/12
See application file for complete search history.

(56) References Cited

U.S. PATENT DOCUMENTS

| | | | |
|---|---|---|---|
| 5,595,693 A | 1/1997 | Fujita et al. | |
| 5,706,193 A | 1/1998 | Linzenkirchner | |
| 5,869,108 A * | 2/1999 | Hiraoka | B29C 45/77 425/145 |
| 6,042,760 A | 3/2000 | Nakazawa et al. | |
| 6,681,145 B1 | 1/2004 | Greenwood et al. | |
| 6,684,145 B1 | 1/2004 | Gianoglio et al. | |
| 7,160,490 B2 | 1/2007 | Hofmann | |
| 9,908,273 B2 | 3/2018 | de Oliveira Antunes et al. | |
| 10,076,861 B2 | 9/2018 | Altonen et al. | |
| 2001/0020753 A1* | 9/2001 | Sato | B29C 45/77 264/40.5 |
| 2008/0039969 A1* | 2/2008 | Liu | B29C 45/76 700/197 |
| 2008/0039970 A1 | 2/2008 | Manda et al. | |
| 2009/0099710 A1 | 4/2009 | Takach, Jr. | |
| 2009/0283177 A1 | 11/2009 | Haas et al. | |
| 2009/0323257 A1 | 12/2009 | Sarid et al. | |
| 2011/0298146 A1 | 12/2011 | Akasaka | |
| 2012/0071702 A1 | 3/2012 | Sutler | |
| 2012/0277900 A1 | 11/2012 | Catoen | |
| 2013/0033221 A1* | 2/2013 | Ueda | G05B 13/041 318/689 |
| 2013/0069280 A1 | 3/2013 | Altonen et al. | |
| 2013/0147078 A1 | 6/2013 | Matsubayashi et al. | |
| 2014/0037779 A1 | 2/2014 | Olaru | |
| 2014/0046465 A1 | 2/2014 | de Oliveira Antunes et al. | |
| 2015/0115491 A1 | 4/2015 | Altonen et al. | |
| 2015/0336311 A1* | 11/2015 | Newman | B29C 45/77 264/279.1 |
| 2016/0158985 A1 | 6/2016 | Fitzpatrick | |
| 2017/0057148 A1 | 3/2017 | Altonen et al. | |

FOREIGN PATENT DOCUMENTS

| | | |
|---|---|---|
| JP | 2001-252957 A | 9/2001 |
| JP | 2002-331561 A | 11/2002 |
| JP | 2010-221493 A | 10/2010 |
| JP | 2014-517784 A | 7/2014 |

OTHER PUBLICATIONS

Chinese Patent Application No. 201680068473.2, Notice on the First Office Action, dated Nov. 11, 2019.

Japanese Patent Application No. 2018-530543, Official Notice of Rejection, dated Jan. 19, 2021.

* cited by examiner

REMOTE CONTROLLER FOR CONTROLLING APPARATUS BY DIVERTING FEEDBACK SIGNAL FROM NATIVE CONTROLLER TO THE REMOTE CONTROLLER AND METHODS FOR SAME

CROSS-REFERENCE TO RELATED APPLICATION

This application is a divisional of U.S. patent application Ser. No. 15/378,874, filed Dec. 14, 2016, which claims benefit of the filing date of U.S. Provisional Patent Application No. 62/267,003, filed Dec. 14, 2015, both of which are hereby incorporated by reference.

TECHNICAL FIELD

The systems and methods described below generally relate to the field of remote controllers for controlling a native feedback controller of an apparatus.

BACKGROUND

Injection molding is commonly used for manufacturing of parts made of meltable material, such as thermoplastic polymers. To facilitate the injection molding of these parts, a solid plastic resin is introduced to a heated barrel that houses a reciprocating screw. The heated barrel and reciprocating screw cooperate to facilitate melting of the plastic and injecting the melted plastic into a mold cavity for forming into a desired shape. Conventionally, an injection molding machine includes a controller that controls various components during the molding process.

SUMMARY

In accordance with one embodiment, a method of manipulating a feedback signal for a native feedback controller of an apparatus is provided. The apparatus further comprises a remote controller retrofit to the native controller. The method comprises sensing a control variable of an actuation unit of the apparatus at a sensor and generating a feedback signal by the sensor based upon the control variable. At the remote controller the method further comprises receiving the feedback signal, generating a control signal based upon the feedback signal, combining the control signal and the feedback signal into a modified feedback signal, and transmitting the modified feedback signal to the native controller in lieu of the feedback signal. The method further comprises, at the native controller, controlling operation of the actuation unit of the apparatus based at least in part upon the modified feedback signal.

In accordance with another embodiment, a method of controlling a control variable of an injection molding apparatus is provided. The injection molding apparatus comprises a heated barrel, an injection shaft, an actuation unit, and a native controller. The actuation unit is operably coupled with the injection shaft and is configured to facilitate operation of the injection shaft with respect to the heated barrel. The method comprises sensing a control variable of the injection shaft at a sensor and generating a feedback signal by the sensor based upon the control variable. At the remote controller, the method comprises receiving the feedback signal, comparing the control variable of the injection shaft to a desired control variable setpoint, generating a control signal based upon the control variable and the desired control variable setpoint, combining the control signal and the feedback signal into a modified feedback signal, and transmitting the modified feedback signal to the native controller in lieu of the feedback signal. At the native controller the method further comprises controlling operation of the actuation unit based at least in part upon the modified feedback signal.

In accordance with another embodiment, an injection molding apparatus comprises an injection molding apparatus that comprises a heated barrel, an injection shaft, an actuation unit, a clamping unit, a nozzle, a native controller, a remote controller, and a sensor. The injection shaft is disposed in the heated barrel and is configured to rotate with respect to the heated barrel. The actuation unit is operably coupled with the injection shaft and is configured to facilitate operation of the injection shaft with respect to the heated barrel. The clamping unit is for a mold. The clamping unit is associated with the heated barrel. The nozzle is disposed at one end of the heated barrel and is configured to distribute contents of the heated barrel to the clamping unit. The native controller is in communication with the actuation unit and is configured to facilitate operation of the injection shaft. The remote controller is in communication with the native controller. The sensor in communication with the remote controller and configured to sense a control variable of the injection shaft. The remote controller is configured detect the control variable from the sensor and compare the control variable to a desired control variable setpoint. The remote controller is further configured to generate a control signal based upon the control variable and the desired control variable setpoint, combine the control signal and the feedback signal into a modified feedback signal, and transmit the modified feedback signal to the native controller in lieu of the first feedback signal. The native controller is configured to control operation of the actuation unit based upon the modified feedback signal.

BRIEF DESCRIPTION OF THE DRAWINGS

It is believed that certain embodiments will be better understood from the following description taken in conjunction with the accompanying drawings in which.

DETAILED DESCRIPTION

Embodiments disclosed herein generally relate to systems, machines, products, and methods of producing products by injection molding and, more specifically, to systems, machines, products, and methods of producing products by low, substantially constant pressure injection molding.

The term "substantially constant pressure" as used herein with respect to a melt pressure of a thermoplastic material, means that deviations from a baseline melt pressure do not produce meaningful changes in physical properties of the thermoplastic material. For example, "substantially constant pressure" includes, but is not limited to, pressure variations for which viscosity of the melted thermoplastic material does not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

Figure 1:
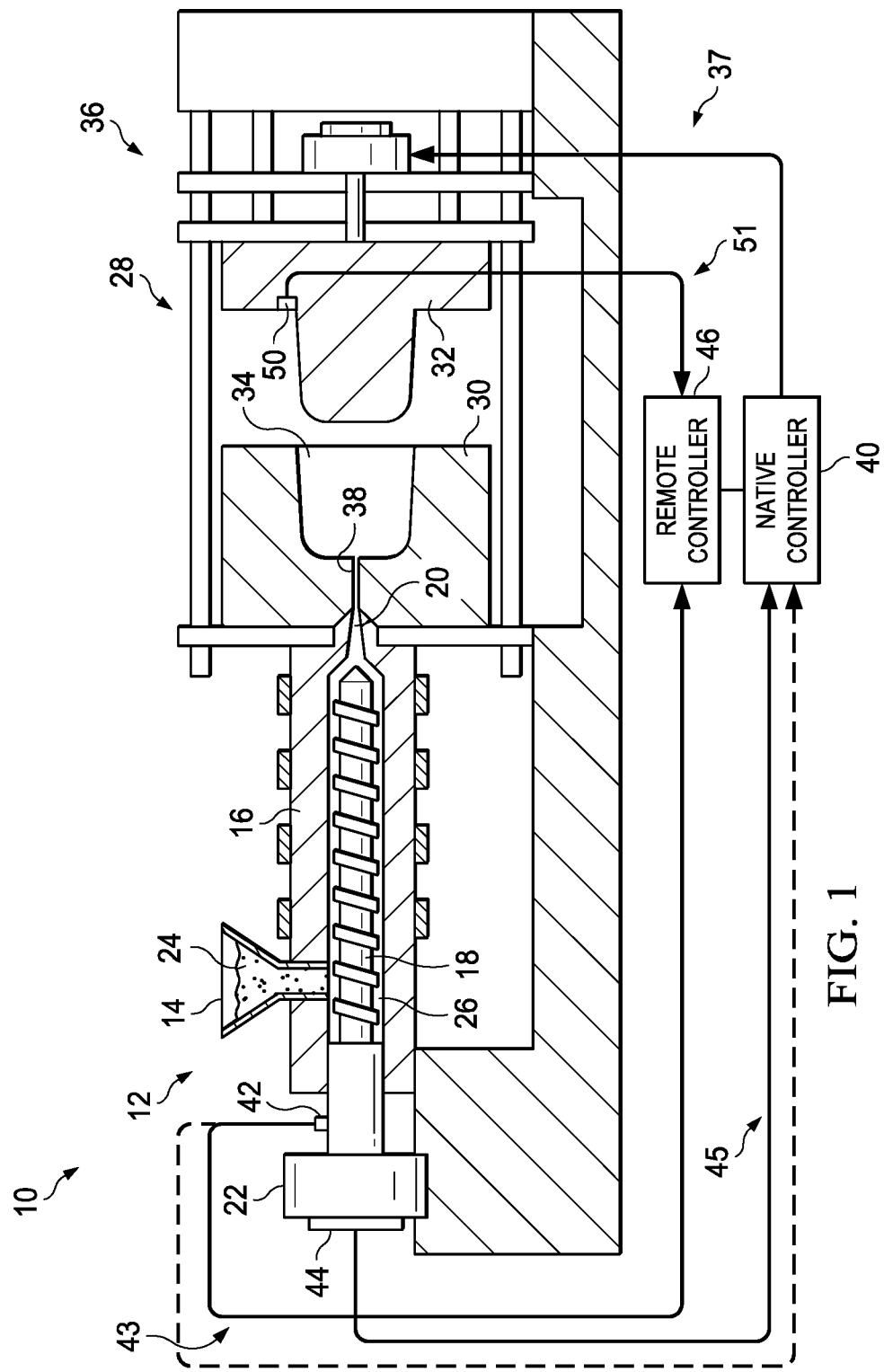
FIG. 1 is a schematic view depicting an injection molding apparatus in accordance with one embodiment.
Figure 2:
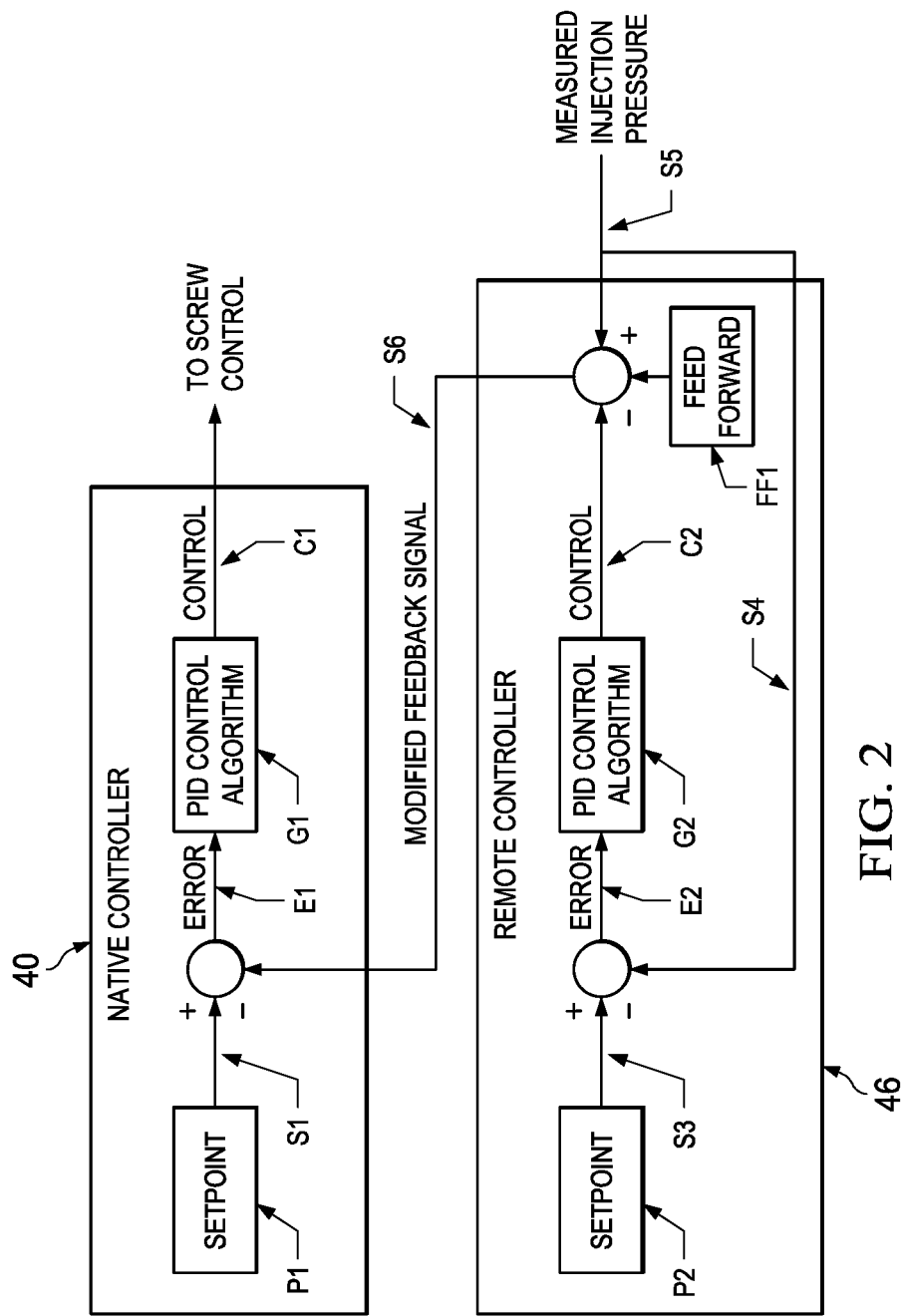
FIG. 2 is a block diagram depicting a native controller of the injection molding apparatus of FIG. 1 in association with a remote controller.

In connection with the views and examples of FIGS. 1-2, wherein like numbers indicate the same or corresponding elements throughout the views, FIG. 1 illustrates an injection molding apparatus 10 for producing molded plastic parts. The injection molding apparatus 10 can include an injection molding unit 12 that includes a hopper 14, a heated barrel 16, a reciprocating screw 18, and a nozzle 20. The reciprocating screw 18 can be disposed in the heated barrel 16 and configured to reciprocate with respect to the heated barrel 16. An actuation unit 22 can be operably coupled to the reciprocating screw 18 to facilitate powered reciprocation of the reciprocating screw 18. In some embodiments, the actuation unit 22 can comprise a hydraulic motor. In some embodiments, the actuation unit 22 can comprise an electric motor. In other embodiments, an actuation unit can additionally or alternatively comprise a valve, a flow controller, an amplifier, or any of a variety of other suitable control devices for injection molding apparatuses or non-injection molding apparatuses. Thermoplastic pellets 24 can be placed into the hopper 14 and fed into the heated barrel 16. Once inside the heated barrel 16, the thermoplastic pellets 24 can be heated (e.g., to between about 130 degrees C. to about 410 degrees C.) and melted to form a molten thermoplastic material 26. The reciprocating screw 18 can reciprocate within the heated barrel 16 to drive the molten thermoplastic material 26 into the nozzle 20.

The nozzle 20 can be associated with a mold 28 having first and second mold portions 30, 32 that cooperate to form a mold cavity 34. A clamping unit 36 can support the mold 28 and can be configured to move the first and second mold portions 30, 32 between a clamped position (not shown) and an unclamped position (FIG. 1). When the first and second mold portions 30, 32 are in the clamped position, molten thermoplastic material 26 from the nozzle 20 can be provided to a gate 38 defined by the first mold portion 30 and into the mold cavity 34. As the mold cavity 34 is filled, the molten thermoplastic material 26 can take the form of the mold cavity 34. Once the mold cavity 34 has been sufficiently filled, the reciprocating screw 18 can stop, and the molten thermoplastic material 26 is permitted to cool within the mold 28. Once the molten thermoplastic material 26 has cooled and is solidified, or at least partially solidified, the first and second mold portions 30, 32 can be moved to their unclamped positions to allow the molded part to be removed from the mold 28. In some embodiments, the mold 28 can include a plurality of mold cavities (e.g., 34) to increase overall production rates.

The clamping unit 36 can apply a clamping force in the range of approximately 1000 P.S.I. to approximately 6000 P.S.I. during the molding process to hold the first and second mold portions 30, 32 together in the clamped position. To support these clamping forces, the mold 28, in some embodiments, can be formed from a material having a surface hardness from more than about 165 BHN to less than 260 BHN, although materials having surface hardness BHN values of greater than 260 may be used as long as the material is easily machinable, as discussed further below. In some embodiments, the mold 28 can be a class 101 or 102 injection mold (e.g., an "ultra-high productivity mold").

The injection molding apparatus 10 can include a native controller 40 that is in signal communication with various components of the injection molding apparatus 10. For example, the native controller 40 can be in signal communication with a screw control 44 via a signal line 45. The native controller 40 can command the screw control 44 to advance the reciprocating screw 18 at a rate that maintains a desired molding process, such that variations in material viscosity, mold temperatures, melt temperatures, and other variations influencing filling rate, are taken into account by the native controller 40. Adjustments may be made by the native controller 40 immediately during the molding cycle, or corrections can be made in subsequent cycles. Furthermore, several signals, from a number of cycles can be used as a basis for making adjustments to the molding process by the native controller 40.

The native controller 40 can be any of a variety of suitable controllers for controlling the molding process. In some embodiments, the native controller 40 can be a PID controller. The native controller 40 can be responsible for controlling a variety of different functions on the injection molding apparatus 10, such as, for example, movement of the clamping unit 36 via a signal line 37. The native controller 40 can be an on-board controller that is original to the injection molding unit 12 and built together with the injection molding unit 12. As such, modifications to the control architecture of the native controller 40 can be time consuming, expensive and at times impossible.

In one embodiment, when the actuation unit 22 is a hydraulic motor, the screw control 44 can comprise a hydraulic valve associated with the reciprocating screw 18. In another embodiment, when the actuation unit 22 is an electric motor, the screw control 44 can comprise an electric controller associated with the reciprocating screw 18. In the embodiment of FIG. 1, the native controller 40 can generate a signal that is transmitted from an output of the native controller 40 to the screw control 44.

Still referring to FIG. 1, a remote controller 46 can be in signal communication with the native controller 40, an injection pressure sensor 42 located in, at, or near, the actuation unit 22, and with a cavity pressure sensor 50 located proximate an end of the mold cavity 34. The injection pressure sensor 42 can facilitate detection (direct or indirect) of the injection pressure inside of the heated barrel 16 (i.e., the pressure of the heated barrel 16 at the beginning of the reciprocating screw 18). The cavity pressure sensor 50 can facilitate detection (direct or indirect) of the melt pressure of the molten thermoplastic material 26 in, at, or near the nozzle 20. The cavity pressure sensor 50 may or may not be in direct contact with the molten thermoplastic material 26. In some embodiments, the cavity pressure sensor 50 can be a pressure transducer that transmits an electrical signal via a signal line 51 to an input of the native controller 40 in response to the cavity pressure within the mold cavity 34. In other embodiments, the cavity pressure sensor 50 can facilitate monitoring of any of a variety of additional or alternative characteristics of the thermoplastic material 26 or the mold 28 that might indicate cavity pressure, such as strain and/or flow rate of the molten thermoplastic material 26, for example. If the cavity pressure sensor 50 is not located within the mold cavity 34, the native controller 40 can be set, configured, and/or programmed with logic, commands, and/or executable program instructions to provide appropriate correction factors to estimate or calculate values for the measured characteristic of the mold 28.

As will be described in more detail below, the remote controller 46 can sense the injection pressure of the heated barrel 16 of the injection molding apparatus 10 and can send a signal (e.g., a modified feedback signal) to the native controller 40 that affects the manner in which the native controller 40 controls the reciprocating screw 18. The remote controller 46 can be any of a variety of suitable controllers for providing a modified feedback signal to the native controller 40 to facilitate alternative control of the molding process. In some embodiments, the remote controller 46 can be a PID controller. In some embodiments, the remote controller 46 can be retrofitted onto the injection molding unit 12 to provide additional functionality not capable of being provided by the native controller 40.

Prior to retrofitting the remote controller 46 onto the injection molding apparatus 10, the native controller 40 can be in signal communication with the injection pressure sensor 42 (shown in dashed lines) located at the actuation unit 22. The injection pressure sensor 42 can provide a feedback signal via a signal line 43 to the native controller 40 that indicates the injection pressure inside of the heated barrel 16. The native controller 40 can detect the injection pressure from the feedback signal and can control (e.g., feedback control) the injection pressure within the injection molding apparatus 10 by controlling the screw control 44, which controls the rates of injection by the injection molding unit 12. To retrofit (e.g., associate) the remote controller 46 onto the injection molding apparatus 10, the output from the injection pressure sensor 42 can be disconnected from the native controller 40 and connected to the remote controller 46 thereby diverting the feedback signal from the injection pressure sensor 42 to the remote controller 46. The cavity pressure sensor 50 can then be coupled to the remote controller 46 thereby completing the retrofit. Once the retrofit is complete, the native controller 40 no longer directly receives feedback signals from the injection pressure sensor 42 or the cavity pressure sensor 50. Instead, the remote controller 46 receives these feedback signals and transmits a modified feedback signal to the native controller 40 that enhances the operation of the native controller 40, as described below. The native controller 40 and the remote controller 46 thus operate in a closed-loop type arrangement that existed prior to addition of the remote controller 46.

In some embodiments, the cavity pressure sensor 50 can already exist on the injection molding unit 12 and can be in signal communication with the native controller 40. In such an embodiment, the output from the cavity pressure sensor 50 can be disconnected from the native controller 40 and reconnected to the remote controller 46. In some embodiments, the cavity pressure sensor 50 might not already exist on the injection molding unit 12. In such an embodiment, the cavity pressure sensor 50 can be installed during retrofitting of the remote controller 46 and then connected to the remote controller 46. For purposes of this disclosure, each of the melt pressure and the cavity pressure can be considered "controlled variables" whereas the injection pressure can be considered a "control variable." A controlled variable can be understood to be any characteristic of the thermoplastic material 26 or mold cavity 34 that can be controlled to facilitate effective filling of the mold cavity 34. A control variable can be understood to be any characteristic of the injection molding unit 12 that can be controlled to facilitate effective control of the reciprocating screw 18 or other injection shaft.

An example block diagram of the feedback relationship between the native controller 40 and the remote controller 46 is illustrated in FIG. 2 and will now be discussed. At the remote controller 46, a setpoint P2 can be provided via signal S3 that represents a desired injection pressure of the injection molding apparatus 10. A signal S5 can be provided to the remote controller 46 that indicates the measured injection pressure of the actuation unit 22. The actual injection pressure can be compared against the setpoint P2 and an error signal E2 can be generated and provided to a PID control algorithm G2 that generates a control signal C2. The control signal C2 and the signal S5 can be combined into a modified feedback signal S6. In some embodiments, the modified feedback signal S6 can also include a feedforward component FF1. The modified feedback signal S6 can additionally or alternatively include any of a variety of other suitable control components that facilitate generation of an effective modified feedback signal.

The modified feedback signal S6 can be transmitted to the native controller 40 in lieu of the feedback signal from the injection pressure sensor 42 (shown in dashed lines on FIG. 1). In one embodiment, the modified feedback signal S6 can be transmitted over a unidirectional transmission link between the native controller 40 and the remote controller 46. In such an embodiment, the native controller 40 does not transmit any signals to the remote controller 46.

At the native controller 40, the operation of the actuation unit 22 can be controlled according to the modified feedback signal S6. For example, a setpoint P1 can be provided via signal S1 that represents a desired injection pressure of the actuation unit 22. The setpoint P1 can be compared against the modified feedback signal S6 and an error signal E1 can be generated. The error signal E1 can be provided to a PID control algorithm G1 that generates a control signal C1 that commands the screw control 44 to advance the reciprocating screw 18 at a rate that causes the injection pressure to converge towards the desired injection pressure indicated by the setpoint P1.

Although the native controller 40 is controlling to the desired injection pressure of the setpoint P1, the modified feedback signal S6 from the remote controller 46 can affect the control signal C from the native controller 40 in a manner that actually controls the injection pressure of the injection molding apparatus 10 to the desired pressure defined by the setpoint P2 (rather than controlling the injection pressure of the actuation unit 22 to the setpoint P1). The remote controller 46 can thus provide the capability to control the injection pressure of the injection molding unit 12 without requiring reprograming/reconfiguration of the control architecture of the native controller 40. As such, the remote controller 46 can be a cost effective and straightforward solution to add functionality to the injection molding apparatus 10 where the native controller 40 is not capable of providing such functionality independently.

During a molding cycle, the injection pressure of the injection molding unit 12 can be changed by changing the setpoint P2. In one embodiment, different setpoints can correspond to a different stage of the molding cycle. For example, to initiate the initial injecting stage, a setpoint can be provided that causes the melt pressure to increase enough to begin melting the thermoplastic pellets 24 and distributing the melt to the nozzle 20. Once the melt pressure has increased enough to begin filling the mold cavity 34, a setpoint can be provided that initiates the filling stage at a pressure that is appropriate to properly fill the mold cavity 34. Once the mold cavity 34 is almost filled (e.g., end of fill), a setpoint can be provided to decrease enough to initiate the packing stage and hold at a substantially constant melt pressure during the holding stage.

The native controller 40 and/or the remote controller 46 can be implemented in hardware, software or any combination of both and can have any control arrangement having one or more controllers for accomplishing control. It is to be appreciated that, although the native controller 40 is described as sensing and controlling the injection pressure of the actuation unit 22, a native controller 40 can be configured to sense and control any of a variety of suitable alternative control variables, such as, for example, a temperature of the heated barrel 16, a volume of the hopper 14, or velocity of the reciprocating screw 18. It is also to be appreciated that, although the remote controller 46 is described as providing the capability to control the injection pressure of the injection molding unit 12, a remote controller using the injection pressure of the actuation unit 22 can be configured to sense and control any of a variety of suitable alternative control variables, such as, for example, cavity pressure.

The foregoing description of embodiments and examples has been presented for purposes of illustration and description. It is not intended to be exhaustive or limiting to the forms described. For, example, although the remote controller 46 is described as being provided on an injection molding apparatus, a remote controller can be provided on any apparatus that employs feedback control from a native controller to add functionality to the apparatus where the native controller is not capable of providing such functionality independently. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An injection molding apparatus comprising:
   a heated barrel;
   an injection shaft disposed in the heated barrel and configured to rotate with respect to the heated barrel;
   an actuation unit operably coupled with the injection shaft and configured to facilitate an operation of the injection shaft with respect to the heated barrel;
   a clamping unit for a mold, the clamping unit being associated with the heated barrel;
   a nozzle disposed at one end of the heated barrel and configured to distribute contents of the heated barrel to the clamping unit;
   a native controller in communication with the actuation unit and configured to facilitate the operation of the injection shaft;
   a remote controller in communication with the native controller;
   a sensor in communication with the remote controller and configured to sense a control variable of the injection shaft and generate a feedback signal based upon the control variable;
   wherein the remote controller is configured to:
      receive the feedback signal from the sensor;
      define a desired setpoint for the control variable;
      compare a value of the control variable to the desired setpoint of the control variable;
      generate a control signal based upon the comparing of the control variable and the desired setpoint of the control variable;
      combine the control signal and the feedback signal into a modified feedback signal; and
      transmit the modified feedback signal to the native controller in lieu of the feedback signal; and
   wherein the native controller is configured to control the operation of the actuation unit based at least in part upon the modified feedback signal.

2. The injection molding apparatus of claim 1, wherein:
   the sensor is an injection pressure sensor that is configured to sense an injection pressure of the heated barrel and generate an injection pressure signal; and
   the remote controller is further configured to receive the injection pressure signal from the injection pressure sensor and determine a value for the injection pressure based upon the injection pressure signal.

3. The injection molding apparatus of claim 1, wherein the remote controller is a retrofit-type controller.

4. The injection molding apparatus of claim 1, wherein the modified feedback signal is transmitted over a unidirectional transmission link between the native controller and the remote controller, and the native controller does not transmit any signals to the remote controller.

5. The injection molding apparatus of claim 1, wherein the injector shaft includes a reciprocating screw.

* * * * *